(No Model.)

E. DIMITY.
CULTIVATOR.

No. 392,997. Patented Nov. 20, 1888.

Witnesses:
Robt Everett
J. A. Rutherford

Inventor:
Engelhard Dimity
By H. W. Stackpole,
Atty.

UNITED STATES PATENT OFFICE.

ENGELHARD DIMITY, OF CLAY CENTRE, KANSAS.

CULTIVATOR.

SPECIFICATION forming part of Letters Patent No. 392,997, dated November 20, 1888.

Application filed March 23, 1888. Serial No. 268,306. (No model.)

*To all whom it may concern:*

Be it known that I, ENGELHARD DIMITY, a citizen of the United States, residing at Clay Centre, in the county of Clay and State of Kansas, have invented certain new and useful Improvements in Cultivators; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in cultivators for listed corn, and the objects are more particularly to construct a simple, cheap, easily-adjusted and durable cultivator, in which the shovels or knives are so arranged as to be readily changed either laterally or vertically, or both laterally and vertically, and secured in the desired position.

Figure 1:
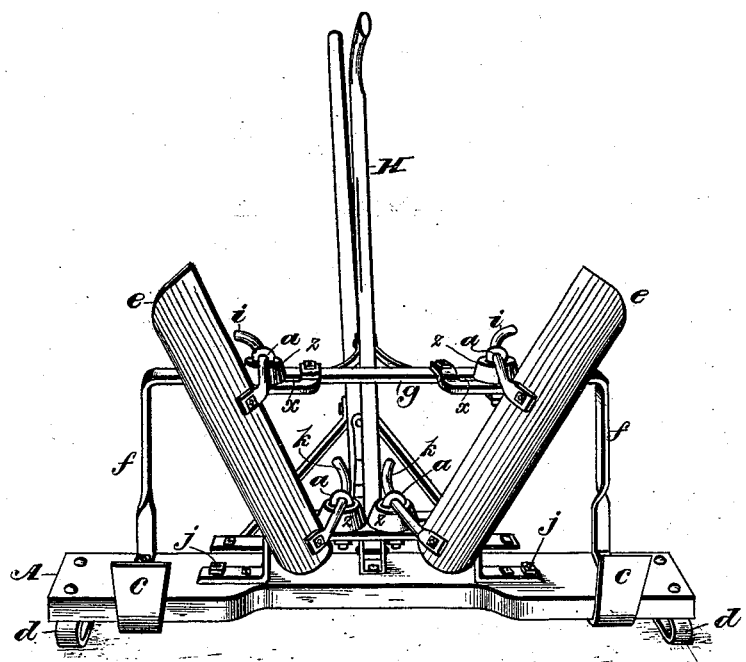
Figure 3:
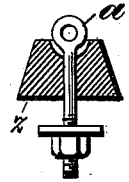
Figure 2:
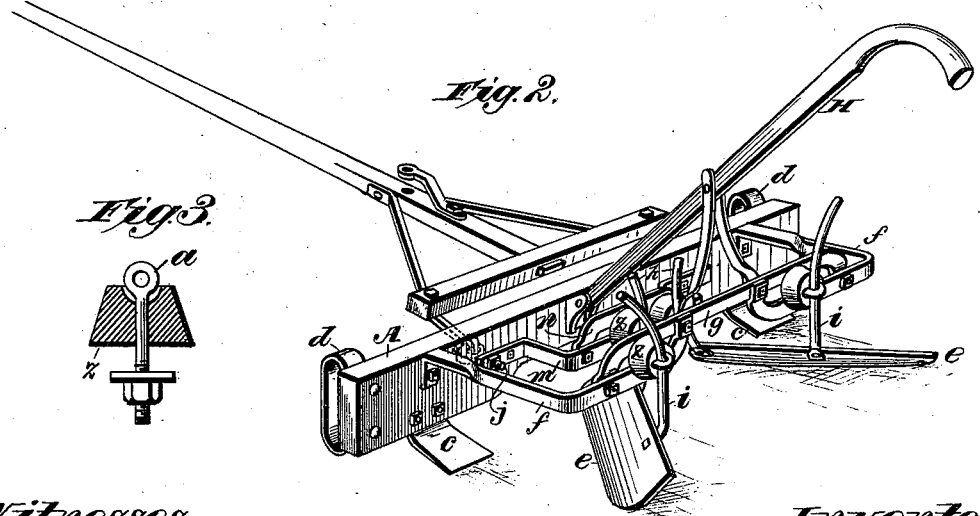

In the accompanying drawings, Figure 1 is a perspective view of my invention in position to be drawn to or from the field. Fig. 2 is a perspective view of same in position for use, and Fig. 3 a vertical section of one of the eyebolts and washer used in the adjustment of the shovels or knives.

Similar letters refer to similar parts throughout the several views.

A is the body.

$d\ d$ are runners, on which the device rests when being transported from one place to another.

$c\ c$ are shoes, on which the device rests when in use.

$i\ i$ and $k\ k$ are arms attached to the shovels $e\ e$, by means of which said shovels are secured to the frame-work $f\ g$ and $m\ n$, and adjusted to the position desired.

$a\ a$ are eyebolts having washers $z\ z$. Said arms $i\ i$ and $k\ k$ are passed through said eyebolts, which, after passing through the slots $x\ x$, are secured to the position desired by nuts bearing against the opposite side of the frame-work.

The pole is coupled to the body A by the ordinary ring or eyebolt coupling; the draw-bars $j\ j$ passing through the middle of the body and secured by nuts to the rear side thereof, thus equalizing the draft when the cultivator is in use and allowing the whole device to be thrown over onto the runners $d\ d$ for transportation.

The handle H is attached to the body A by means of a clevis firmly secured to the body and having sufficient space between its jaws to admit the ears of a fender, which, as well as the handle, is held in place by the bolt $h$.

It will be seen by reference to the drawings that a groove is cut midway of the under side of the body and the frame-work correspondingly shaped to allow the cultivator to pass freely over the plants, and that the frame-work is so constructed as to provide slots $x\ x$ for the lateral adjustment of the shovels. The vertical adjustment is accomplished by loosening the eyebolts and raising or lowering the shovels to the desired position, where they are secured by again tightening the eyebolts. The lateral adjustment is by loosening the eyebolts, as above mentioned, and adjusting the shovels laterally.

Having thus described my invention, what I claim as new, and desire to secure by Letters Patent, is—

1. In a cultivator, the combination, with the body A, having frame-work $f\ g$ and $m\ n$, of the shovels $e\ e$, connected therewith by means of the arms $i\ i$ and $k\ k$, passing through the eyebolts $a\ a$, whereby said shovels may be adjusted either laterally or vertically, or laterally and vertically, substantially as and for the purpose set forth.

2. In a cultivator having body A, the combination, with the frame-work $f\ g$ and $m\ n$, having slots $x\ x$, of the shovels $e\ e$, having arms $i\ i$ and $k\ k$, connected with said frame-work by eyebolts $a\ a$, passing through said slots, substantially as and for the purpose set forth.

In testimony whereof I affix my signature in presence of two witnesses.

ENGELHARD DIMITY.

Witnesses:
 WM. HIGINBOTHAM,
 F. B. DAWES.